United States Patent [19]

Vilhelmsson et al.

[11] Patent Number: 4,789,214

[45] Date of Patent: Dec. 6, 1988

[54] MICRO-OPTICAL BUILDING BLOCK SYSTEM AND METHOD OF MAKING SAME

[75] Inventors: Kennet J. A. Vilhelmsson, Oceanside; Tomas E. Lock, Carlsbad, both of Calif.

[73] Assignee: Tacan Corporation, Carlsbad, Calif.

[21] Appl. No.: 98,980

[22] Filed: Sep. 21, 1987

[51] Int. Cl.⁴ .................... G02B 6/26; B05D 5/06
[52] U.S. Cl. .................... 350/96.15; 350/96.11; 350/96.12; 350/96.17; 350/320; 250/227; 427/162; 427/164; 427/165; 427/167; 357/19; 264/1.7; 437/51; 437/60; 437/80; 437/225; 437/915; 437/924
[58] Field of Search .............. 350/96.10, 96.11, 96.12, 350/96.13, 96.14, 96.15, 96.16, 96.17, 96.21, 96.20, 320; 250/227; 427/53.1, 54.1, 162, 163, 164, 165, 167; 264/1.1, 1.4, 1.2, 1.5, 2.5, 1.7; 357/17, 19; 437/15, 19, 20, 36, 38, 41, 47, 51, 80, 225, 228, 229, 915, 924

[56] References Cited

U.S. PATENT DOCUMENTS

| | | | |
|---|---|---|---|
| 4,070,516 | 1/1978 | Kaiser | 350/96.12 X |
| 4,079,404 | 3/1978 | Comerford et al. | 357/19 |
| 4,130,343 | 12/1978 | Miller et al. | 350/96.15 |
| 4,130,345 | 12/1978 | Doellner | 350/96.15 |
| 4,147,403 | 4/1979 | d'Auria et al. | 350/96.17 |
| 4,164,364 | 8/1979 | Witte | 350/96.17 |
| 4,241,109 | 12/1980 | Johnson | 427/162 X |
| 4,285,571 | 8/1981 | Winzer | 350/96.15 |
| 4,286,838 | 9/1981 | Huignard et al. | 350/96.11 |
| 4,293,826 | 10/1981 | Scifres et al. | 357/19 X |
| 4,297,653 | 10/1981 | Scifres et al. | 357/19 X |
| 4,306,765 | 12/1981 | Winzer et al. | 350/96.16 |
| 4,307,932 | 12/1981 | Winzer | 350/96.15 |
| 4,325,605 | 4/1982 | Winzer et al. | 350/96.15 |
| 4,339,290 | 7/1982 | Winzer et al. | 156/159 |
| 4,343,890 | 8/1982 | Phillips et al. | 427/163 X |
| 4,376,160 | 3/1983 | Evanchuk | 427/162 X |
| 4,422,088 | 12/1983 | Gfeller | 357/19 |
| 4,472,020 | 9/1984 | Evanchuk | 350/96.12 |
| 4,483,582 | 11/1984 | Sheem | 350/96.15 |
| 4,498,731 | 2/1985 | Winzer et al. | 350/96.16 |
| 4,609,252 | 9/1986 | Wong et al. | 350/96.12 |
| 4,708,423 | 11/1987 | Erman et al. | 350/96.15 |

FOREIGN PATENT DOCUMENTS

| | | | |
|---|---|---|---|
| 0171615 | 2/1986 | European Pat. Off. | 350/96.11 |
| 54-105559 | 8/1979 | Japan | 350/96.17 |
| 56-24984 | 3/1981 | Japan | 357/19 |
| 56-24983 | 3/1981 | Japan | 357/19 |
| 56-161681 | 12/1981 | Japan | 357/19 |
| 59-119312 | 7/1984 | Japan | 350/96.11 |
| 60-173502 | 9/1985 | Japan | 350/96.11 |
| 61-121014 | 6/1986 | Japan | 350/96.11 |
| 61-153603 | 7/1986 | Japan | 350/96.17 |

OTHER PUBLICATIONS

Ash et al., "Interconnection of Optical Fibers to Planar Optical Integrated Circuitry", IBM Tech Discl. Bull., vol. 13, No. 9, 2/71, pp. 2529-2530.

(List continued on next page.)

Primary Examiner—William L. Sikes
Assistant Examiner—Brian M. Healy
Attorney, Agent, or Firm—Baker, Maxham & Jester

[57] ABSTRACT

A micro-optical building block system for optical processing of light signals and method for making the components used in the system. The basic system includes a master substrate on which is mounted at least one building block. Typically, there are a multiplicity of predefined positions at which the building blocks will mate with the master substrate. Building blocks can be positioned adjacent to each other on the master substrate in such a way as to allow light signals to be transferred between them. Mating relief patterns are formed on both the master substrate and the building block substrates, the relief pattern areas on the master substrate being adjacent and repetitive, or alternatively, different patterns. The mating relief patterns enable self alignment of the building blocks at predetermined positions on the master substrate. The relief pattern on the building blocks is adapted to be employed to embody a variety of optical components as integral or constituent parts of the relief pattern. Alternatively, the relief pattern is used as a mechanical fixture for optical or mechanical components, or both, which define the functions of the building blocks.

71 Claims, 9 Drawing Sheets

OTHER PUBLICATIONS

Balliet et al., "Module-to-Module Communications via Fiber-Optic Piping", IBM Tech Discl. Bull., vol. 22, No. 8B, 1/80, pp. 3519–3520.

Kersten, "Modified Thick Film Technology for Multimode Integrated Optics", Optics Comm., vol. 28, No. 1, 1/79, pp. 51–54.

Kokubun et al., Silicon Optical Printed Circuit Board for Three-Dimensional Integrated Optics, vol. 21, No. 11, Electronic Letters, pp. 508–509 (May 1985).

Miller, Active Optical Fiber Tap, Fiber Optic Production News (May/Jun. 1986).

MICRO-OPTICAL BUILDING BLOCK SYSTEM AND METHOD OF MAKING SAME

FIELD OF THE INVENTION

This invention relates generally to micro-optical systems and more particularly to a flexible building block system for optical processing of light signals in a variety of ways.

BACKGROUND OF THE INVENTION

The traditional way of building optical systems has been to make use of discrete optical components such as mirrors, lenses and filters. These components have found extensive use and can be utilized in many types of applications. However, in many situations, particularly with increased emphasis on miniaturization, discrete components are often too bulky and too difficult to interconnect.

Some of these obstacles have been overcome by the development of integrated optics, where all the different optical components are made directly on a substrate. This approach has made it possible to make a large variety of miniature components, but with consequent greatly increased manufacturing complexity and lack of flexibility which does not permit the circuit designer or engineer to rapidly change a design.

The prior art typically employs three dimensional structures for interconnecting optical fibers in predetermined fashions. Examples of such three dimensional structures are found in U.S. Pat. Nos. 4,339,290, 4,498,731 and 4,130,345. In the first patent listed above, and in U.S. Pat. No. 4,483,582, building blocks are employed in optical systems where the adjacent building blocks are aligned by physical contact with each other and not by precise interconnection with a master substrate or equivalent framework.

Several different means of holding optical fibers in predetermined locations are known. Examples of using a polymeric relief pattern are shown in U.S. Pat. Nos. 4,339,290 and 4,164,364. These patterns may be photolithographically created thick film patterns. However, the use of these patterns as shown in the prior art is only for alignment of optical fibers and has no other functions.

The optical systems of the first three patents mentioned above, and U.S. Pat. Nos. 4,306,765 and 4,130,343, disclose semi-reflective or transmissive layers on or in conjunction with optical fiber services. In itself, the use of such layers is well known in optical fiber systems.

One problem with many of the prior art multiple element systems of the type mentioned above is that because the components depend upon accurate surface treatment for proper alignment, errors can be cumulative. In this way, a system so constructed may be very inaccurate in certain aspects of its alignments due to such cumulative errors.

SUMMARY OF THE INVENTION

In accordance with this invention, the fiber alignment problem has been solved with the aid of photolithographically formed relief pattern elements that hold and support the optical fibers on the building block substrate and provide means to mate with a relief pattern on a master substrate. The relief pattern elements can be very accurately created with standard photographic methods.

This invention unites the flexibility of discrete components with the possibility of making very compact, optical systems on a master substrate. In one embodiment, the invention consists of surface mounted miniaturized optical components forming a set of similarly shaped building blocks. The blocks are adapted to be closely adjacent for optical signal transmission between them and can be mounted on the master substrate in much the same way as electronic components are mounted on a printed circuit board. In this system, the building blocks are self-aligning and can be either passive or active.

This invention provides, in a relatively non-complex manner, extreme accuracy in alignment of optical components, such as optical fibers, in a building block system having a number of different functions. The invention makes it possible to design a multitude of complex optical configurations using a limited number of mechanical, optical, electro-optical or magneto-optical building blocks. Examples of passive structures that can be created by means of the building block system of this invention include optical splitters, filters, combiners and transmission lines. Active optical or electro-optical structures constructed according to this invention include transmitters, receivers and modulators.

The invention is directed to a system of optical building blocks which are intended to be mounted on the surface of a master substrate. The size and shape of a master substrate can vary but it always exhibits at least one flat surface having dimensions equal to or larger than the mating surface dimensions of the smallest building block adapted to be mounted to it. This flat part of the master substrate constitutes the surface on which at least one building block can be mounted.

The building blocks themselves can have different geometrical shapes, such as triangular, rectangular, circular and hexagonal, among others, but they all have one flat surface which will either be in contact or in closely adjacent juxtaposition with the flat surface of the master substrate. The distance defining means between surfaces could be on or more fibers or other physical elements, such as intermediate substrates with fibers mounted thereto.

BRIEF DESCRIPTION OF THE DRAWING

The objects advantages and features of this invention will be more readily appreciated from the following detailed description when read in conjunction with the accompanying drawing in which.

DESCRIPTION OF THE PREFERRED EMBODIMENTS

Figure 1:
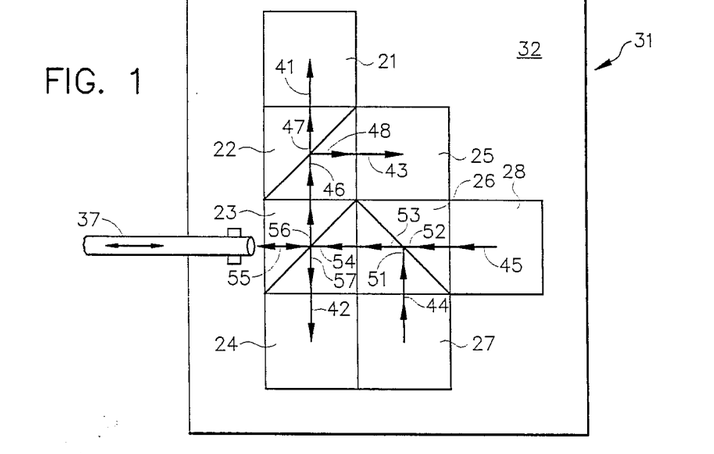
FIG. 1 is a schematic representation of the invention showing a substrate with several building blocks mounted thereon having different functions and all integrated into a combined receiver and transmitter configuration.

With reference now to the drawing and more particularly to FIG. 1 thereof, there is shown a general representation of the invention comprising a system of optical building blocks 21–28 mounted on surface 32 of master substrate 31. The functions of the building blocks can be, for example, light branching, combining and interconnection, detection and transmission, and different kinds of light modulation. The size and shape of master substrate 31 can vary, but it always has at least one flat surface 32 that is equal to or larger than the size of the smallest building block. The flat part of the master substrate constitutes the surface on which at least one building block is mounted.

Figure 5:
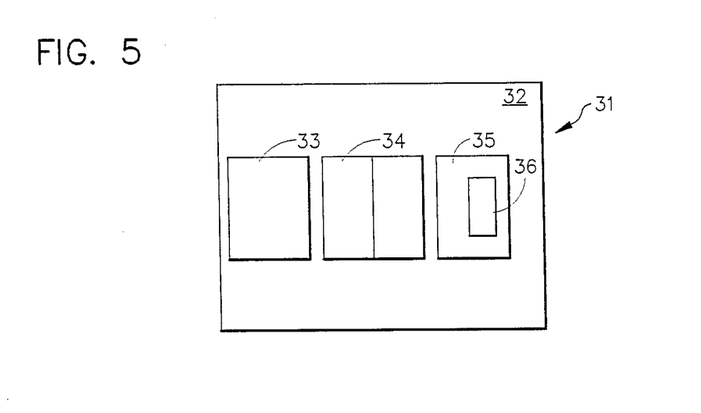
FIG. 5 is a plan view of a master substrate with several different building blocks thereon.
Figure 6:
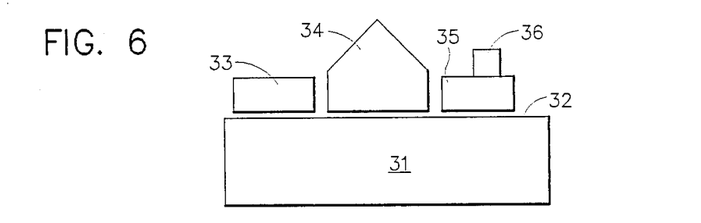
FIG. 6 is an elevational view of the structures of FIG. 5.

As shown in FIGS. 5 and 6, the building blocks can have different geometrical shapes. For example, building block 33 is a flat, rectangular structure while building block 34 has a roof shape. Building block 35 has been shown as a flat, rectangular building block with an additional element 36 mounted on the top thereof. No matter what their shapes, the building blocks normally have at least one flat surface, which is maintained in contact or nearly in contact with the flat surface of the master substrate. The building blocks may also include intermediate bodies, as will be explained with respect to FIG. 11.

Examples of the materials of which the elements of this system can be made include metals, dielectrics or semiconductors. Examples of the metals which can be used for the building blocks and the master substrate include aluminum, stainless steel and brass. Appropriate dielectric materials include glass, ceramics and plastic. Typical semiconductor materials are silicon and gallium arsenide. Examples of more sophisticated materials may be different kinds of optically nonlinear polymers and crystals. Each building block may be made of one or several different materials. For example, a certain constituent part of a building block may be of a dielectric while another part of the same building block is made of aluminum. These two parts may be held together by either a permanent joint such as an adhesive or a joint that enables the parts to be separated, such as clips, bolts or screws.

The materials mentioned above are provided by way of example only and are not to be limiting. Any materials which can achieve the basic objectives and provide the characteristics desired for each element may be employed as part of this invention.

Referring again to FIG. 1, optical fiber 37 can provide incoming light signals or can be a means of transmission of outgoing signals from the combination of building blocks on the master substrate. Some of the building blocks shown in FIG. 1 will be discussed in greater detail below but their basic characteristics are pointed out here to provide a better understanding of the flexibilities available in a relatively simple structure such as that shown in FIG. 1.

Building blocks 21, 24 and 25 may be configured as detectors, the structure of which will be discussed later. Light signals are applied to these blocks by means of optical waveguides 41, 42 and 43 respectively. Building blocks 27 and 28 are shown as signal source blocks. They may employ a laser source or a light emitting diode (LED). Optical signals are sent from these blocks into the other blocks of this particular system by means of optical waveguides 44 and 45 respectively. Building block 22 is configured as a branching element with a signal entering through optical waveguide 46 and being split in two directions to exit the block by means of optical waveguides 47 and 48. Building blocks 26 is configured as a combining block where two signals entering by means of optical waveguides 51 and 52 are combined and exit through optical waveguide 53. Finally, building block 23 may function as both a branching and a combining block. It is a 4-port element, as opposed to blocks 22 and 26 which are 3-port elements. Thus signals can enter, in the structure shown, through optical waveguides 54 or 55 (from input/output waveguide 37), or both. As shown, these signals can be split and transmitted from block 23 by means of optical waveguides 56 and 57.

Figure 2:
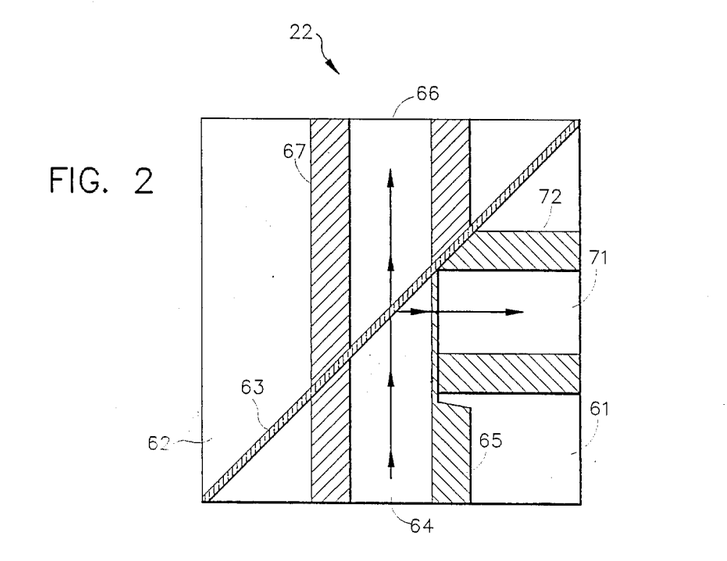
FIG. 2 shows on an enlarged scale the basic design of one embodiment of a building block of FIG. 1.

Building block 22 has been chosen as the subject of FIG. 2 to better explain the structure of a typical building block. This block is comprised of two triangular segments 61 and 62. These triangular elements are separated by partially reflecting surface 63. Incoming optical fiber core segment 64 is covered by cladding material 65. Similarly, outgoing fiber core segment 66 has cladding 67 thereon. The other outgoing fiber core 71 is formed with cladding material 72. For purposes of convenience, reference numerals 64, 66 and 71 will be used to refer more generally to the composite fiber or waveguide.

FIG. 2 provides an example of the basic design principles of the optical building blocks of the invention. The optical fibers mounted on the building block substrate are used as waveguide elements. The fibers are configured in such a way that an incoming light signal is totally or partially reflected into another fiber that is placed at an angle with respect to the incoming fiber. In this way it is possible to make 2-, 3-, and 4- port configurations. This is an example of a passive building block. Although fiber 71 is shown at a 90° angle with respect to fibers 64 and 66, those fibers could meet at any practical angle other than 90°. Other passive building blocks include wavelength multiplexers and demultiplexers.

Figure 3:
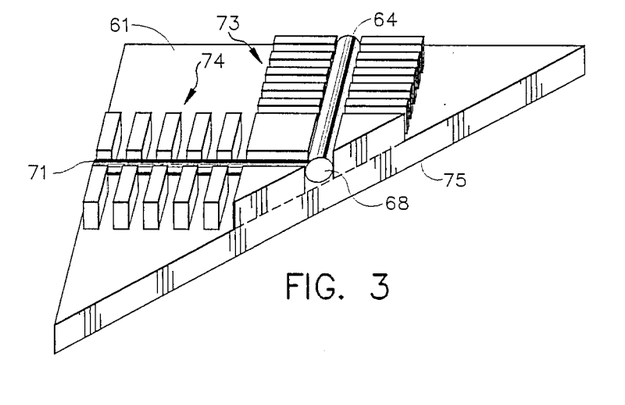
FIG. 3 is an enlarged perspective representation of a portion of the building block of FIG. 2.

The structure of FIG. 2 is shown more graphically in FIG. 3. Clad fibers 64 and 71 are held in place by means of relief patterns 73 and 74 respectively. In making building block 22, normally the starting point would be a building block substrate in the rectangular form shown in FIG. 2 having appropriate relief patterns as necessary for retaining the optical fibers and for engaging appropriate relief patterns on the master substrate. After the fibers have been placed, the building block substrate is cut on the diagonal, leaving face 75 including end 68 of fiber 64, exposed. This entire face including the fiber is ground and polished and coated with a reflective or transmissive layer. Note that this coating 63 (as shown in FIG. 2) may be wavelength sensitive so that it functions as an optical filter. It may also be totally reflective to certain wavelengths, totally transmissive to other wavelengths and have any range of transmissivity in between for any particular wavelength.

An important feature of this invention which is common to the building blocks and to the master substrate on which the building blocks are to be mounted is the relief patterns that are formed on the flat surfaces of the blocks and of the master substrate. These relief patterns serve the dual function of supporting the optical waveguides in their predetermined locations and for aligning and fixing the building blocks to the master substrate in precise locations. The relief pattern on the building blocks is shaped and configured so that it mates in the predetermined areas of the relief pattern on the master substrate. The building blocks thus align primarily to the master substrate and secondarily align to each other.

This concept of the relief patterns used for element alignment enables the relaxation of the demands which one would normally expect for very accurate mechanical manufacturing tolerances of the physical dimensions of the building blocks. In this invention, the accuracy of alignment is assured by making very accurate relief patterns on the flat surfaces of the elements using known methods, normally photographic in nature.

While it may be possible to use a single building block without other building blocks or the master substrate, it is contemplated that the invention will normally consist of a system of one or more building blocks on a master substrate. The relief pattern of the building blocks and of the master substrate are so configured as to allow the building blocks to be mounted in any one of a multitude of predefined positions on the master substrate. If more than one building block is placed on the master substrate, they may be mounted either in close juxtaposition for direct coupling of light signals or they may be spaced by a predetermined distance and still provide for signal coupling.

The relief pattern on the flat surfaces of the building blocks and the master substrate can be formed in many different ways. One way is to use wet or dry etching methods in order to remove the material from the surface region, thus creating the desired pattern of lands and valleys or grooves. Another way to make the relief pattern is to apply a thick film photosensitive layer on the flat surfaces of both the building blocks and the master substrate. By using known photolithographic methods it is possible to accurately form the desired pattern in the photosensitive layers. Other possible methods for making the relief patterns include stamping, molding, grinding, embossing, laser cutting or machining, laser etching, and machining such as by electro-chemical, hydrodynamic, abrasive jet or ultrasonic means.

The distribution of light within a building block as well as the optical interaction between different building blocks can be accomplished by means of either guided wave propagation or by free propagation in air or other optical media. The concept of using mating relief patterns for alignment of building blocks to the master substrate is especially useful in situations where the optical signals propagate in optical waveguides within a block. In this situation the relief patterns may not only serve as means for alignment of the building block to the master substrate but the patterns can also be designed to constitute the waveguides or to physically hold and align the optical waveguides which are used for the distribution within a building block. In general, the relief patterns of a building block can be designed to embody optical waveguides or other optical components as integral parts of a pattern or the relief pattern can serve as a mechanical fixture for optical waveguides or other optical and mechanical components which define the function of the building block.

Figure 4:
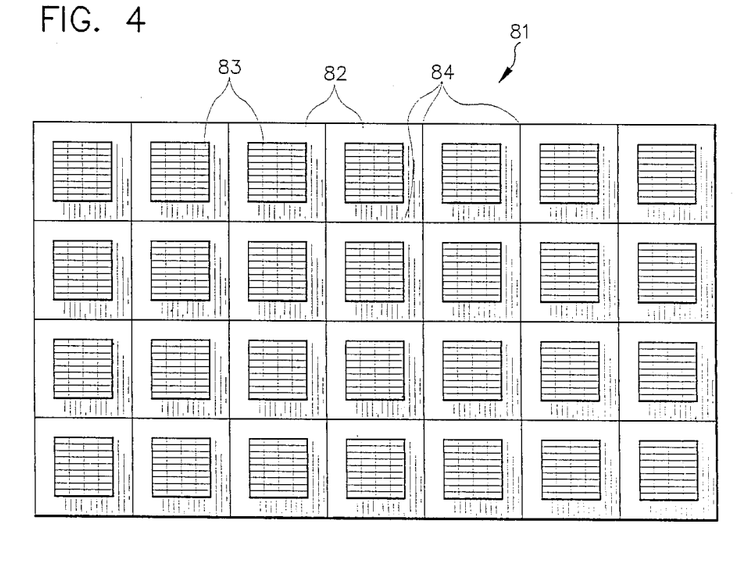
FIG. 4 is a plan view of an example of a starting body having relief patterns thereon from which building blocks are formed.

The process of manufacturing building blocks is comprised of several steps. A starting body of desired material having one flat surface is chosen, the size of the surface being at least as large as the block that is to be made. The flat surface is divided into sub-units, each representing the flat surface of a building block or part of a building block. With reference to FIG. 4, the starting body 81 is divided into sub-units 82. Relief patterns 83 are formed on the flat surface of the starting body using methods mentioned above. The geometry using this system is basically two-dimensional. It is therefor possible to create the relief pattern for a large number of building blocks on a single starting body surface simultaneously.

Normally, at this point, with a number of relief patterns, typically repetitive in nature, being formed on the flat surfaces of a starting body, passive components such as optical fibers are mounted and adhesively bonded in their respective positions in the relief patterns. Then the starting body is cut along the lines 84 which define the sub-units to separate the building blocks from each other. It is possible that the steps of mounting the passive components and separation of the building blocks can be reversed.

After separating the building blocks, the cut edges are ground and polished and the surfaces which are to be coated with reflective or transmissive layers are polished to optical quality. At this point the reflective or transmissive coating are applied and then the active components such as detectors, transmitters and modulators are mounted on to the building blocks.

There are substantial similarities in the process of manufacturing the master substrate, and FIG. 4 is illustrative thereof. Again, the starting body of desired material is chosen having at least one flat surface, the size of the surface being at least as large as the master substrate that is to be made which is at least as large as a building block which is to be mounted thereon. The flat surface is then divided into sub-units, each representing the flat surface of a master substrate. The relief patterns of the master substrates are formed on the flat surface of the starting body as previously described. Again, it is a two-dimensional system as a large number of master substrate relief patterns may be formed simultaneously. The starting body is then cut along the lines defining the sub-units and the cut edges are ground. Thus, the processing for manufacturing the master substrate is very similar to that for the building blocks except that the passive and active optical component are normally not added. However, in some instance the passive and active components may be mounted on the master substrate.

Figure 7:
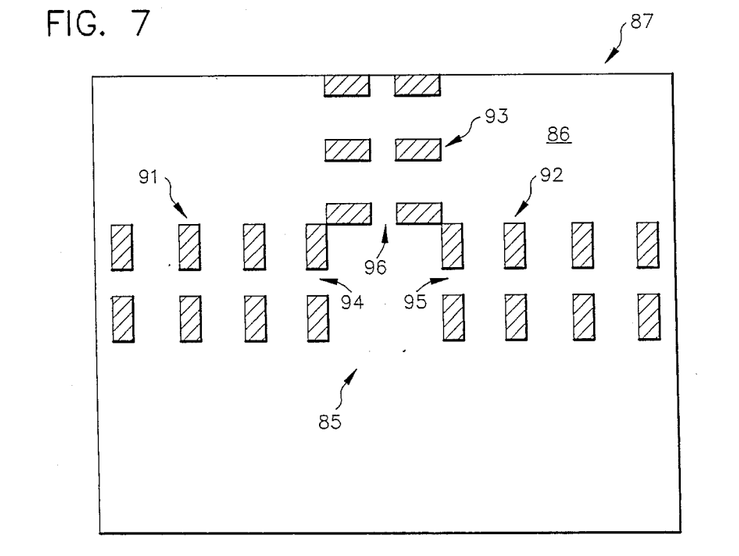
FIG. 7 is a greatly enlarged plan view of an example of a portion of the relief pattern on a master substrate.

Specific details of the relief patterns and the manner in which they mate will not be described. FIG. 7 shows an example of a typical relief pattern 85 on flat surface 86 of master substrate 87. This could be the entire master substrate pattern surface, or only a small segment of a much larger substrate and pattern complex. The elements of the relief pattern are arranged in small groups 91, which is spaced from and in alignment with group 92, both of which are obtained perpendicularly, to group 93. Note that elongated slot 94 passes through the elements of group 91 which is in alignment with slot 95 which passes through group 92. Slot 96 passes through group 93 and is perpendicular to slots 94 and 95. Again, this is a particular example of relief pattern layout. The pattern could be a continuous overall pattern or it could be a combination of several groups of patterns, which may or may not be eventually repetitive.

Figure 8:
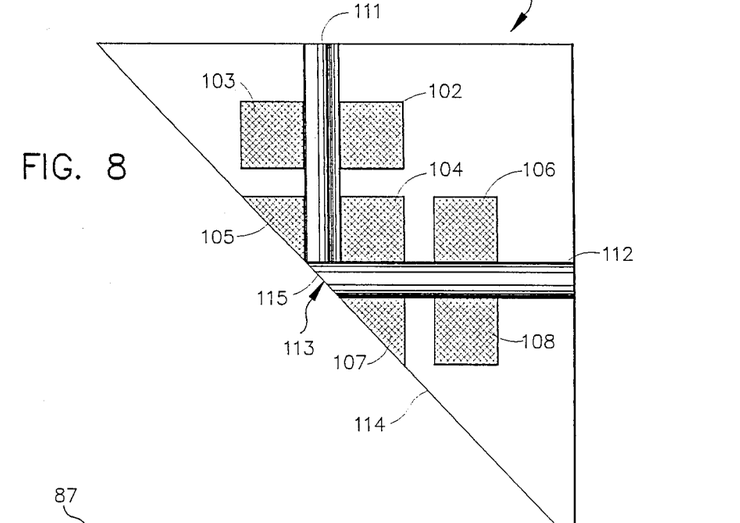
FIG. 8 is a greatly enlarged plan view of an example of the relief pattern on a building block.

The flat surface of a typical building block 101 is shown in FIG. 8, with relief pattern elements 102–108. Positioned in the slot defined by relief pattern elements 102 and 104 on one side and 103, 105 on the other is optical fiber 111. Optical fiber 112 is positioned in the slot formed by relief pattern elements 104, 106 on one side and 107, 108 on the other. Beveled face 113 of optical fiber 112 and co-planar diagonal face 114 of building block substrate 101 are polished to optical quality and then coated with a reflective or transmissive coating. Note that the squared end 115 of optical fiber 111 abuts the side of optical fiber 112 adjacent beveled face 113.

Figure 9:
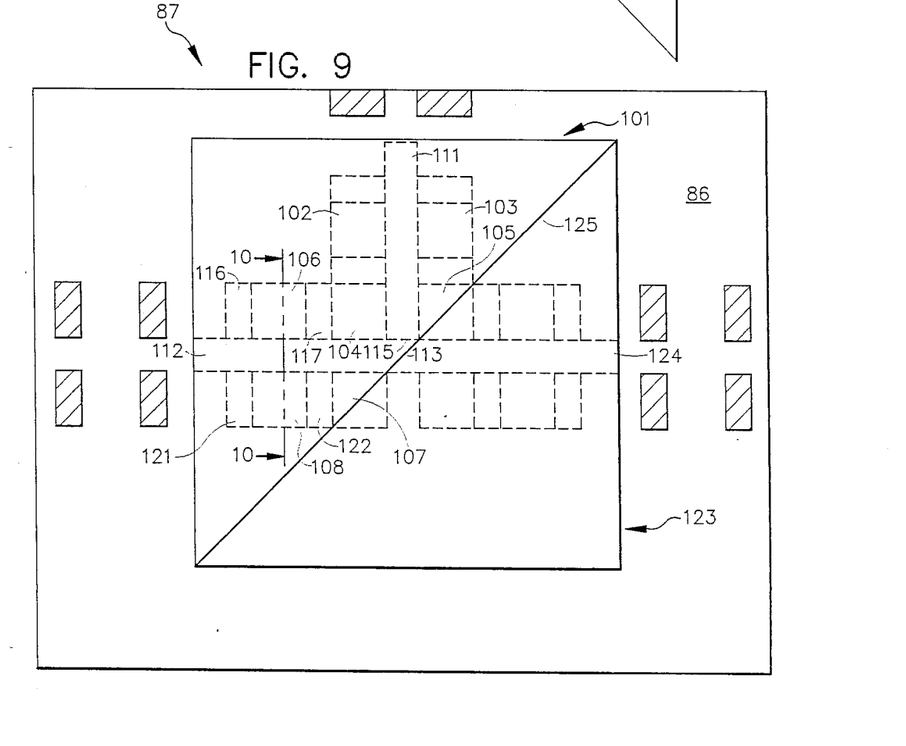
FIG. 9 shows the elements of FIGS. 7 and 8 fitted together, along with another building block portion.

FIG. 9 shows building block element 101 of FIG. 8 inverted and placed in position in array 85 on master substrate 87. Building block relief pattern element 106 resides between master substrate relief pattern elements 116 and 117, building block element 108 resides between master substrate elements 121 and 122 and so on for the rest of the building block relief pattern elements previously discussed. A second building block element 123, which is equivalent to portion 62 of the building block of FIG. 2, is also fit into relief pattern 85 of the master substrate so that it mates with building block element 101. In this feature, optical fiber 124 is, in effect, the continuation of optical fiber 112 which meets at partially reflective or transmissive face 113. Diagonal line 125 between building block element 101 and 123, which includes face 113, could represent a refractive index matching substance, if desired, positioned between the two building blocks.

Figure 10:
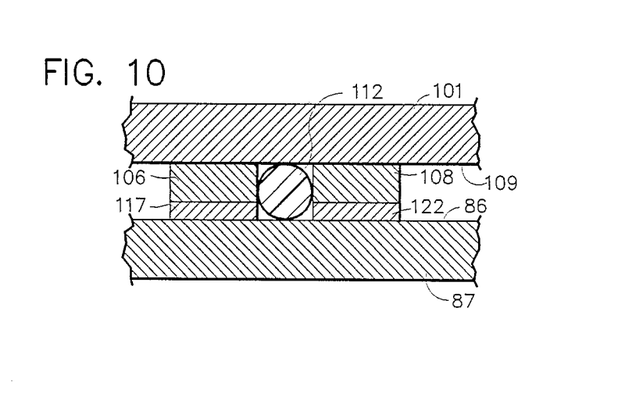
FIG. 10 is a greatly enlarged sectional view taken along cutting plane 10—10 in FIG. 9.

It is instructive to realize the typical dimensions involved in the structure described above. With reference to FIG. 10, which is an enlarged cross section of a small portion of the structure as indicated in FIG. 9, some of the important relationships are shown. As can be seen in FIG. 10 the distance between the flat face 109 of building block substrate 101 and flat face 86 of master substrate 87 is defined by the diameter of optical fiber 112. Thus, when the building block is mounted on the substrate as shown in FIG. 9, the relief pattern elements mesh together but normally do not come in contact with the flat surface of the opposite member. The diameter of a typical optical fiber is 125–200 μm, and that, of course, defines the distance between the substrate flat faces. The height of the relief pattern elements ranges from 80–120 μm. The lateral dimensions of the relief pattern elements are 150–300 μm on a side. The master substrate itself typically has lateral dimensions of 5–100 mm and is 0.5–1.5 mm thick. The surface dimensions of the building block are typically 1–10 mm, with a thickness of 0.5–1.5 mm. These dimensions are given for reference purposes only and to help visualize the minute nature of the structure of this invention. These dimensions are not by way of limitation and any sizes larger or smaller would not affect the principles of the invention.

An extension of the structure discussed above is shown in FIG. 11. Building block substrate 101 is formed with relief pattern elements 106 and 108 on flat surface 109, confining between them fiber 112. Master substrate 87 is formed with relief pattern elements 117, 118 and 122 on flat surface 86. Between these building block system components is intermediate substrate 119 having oppositely disposed flat surfaces 120 and 126. Relief pattern elements 127 and 128 are on surface 120 and mate with pattern elements 106 and 108 on the building block substrate to locate optical fiber 112 as in FIG. 10. Relief pattern elements 129 and 130 are on surface 126, partially confining optical fibers 137 and 138.

Figure 11:
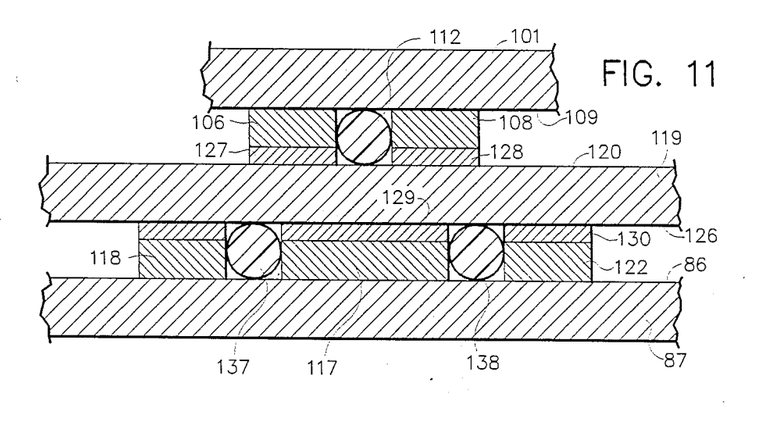
FIG. 11 is a sectional view similar to FIG. 10 showing an intermediate body between the building block and the substrate.

The function of the intermediate substrate and its relief pattern elements is the same as described above with respect to the building block and master substrates. It merely serves to provide a multi-layer structure. There could be more than one intermediate layer as desired, functioning in the same way.

It is important to note that the shape of the structures of the relief pattern need not be rectangular as shown but could be round, hexagonal, triangular or any other shape.

There are a number of building block functions which can be achieved by using the concept of two mating relief patterns as described above. These functions relate to different kinds of active modulation, detection or emission of light signals, as well as passive distribution of light to different locations in space. All of the functions can be accomplished by using the relief patterns of the building blocks, either as integral parts of the components that define the functions of the building blocks, or the relief patterns can serve as mechanical fixtures for those components that define the functions of the building blocks. Then, in substantially all cases, the building block relief patterns mate with the relief pattern of the master substrate so as to align and locate the building blocks at predefined positions on the master substrate. No matter their external shape, the building blocks all have at least one flat surface on which the relief pattern is formed.

There are several passive functions contemplated for this building block system, including interconnection, bending, branching, combining and splicing.

Figure 15:
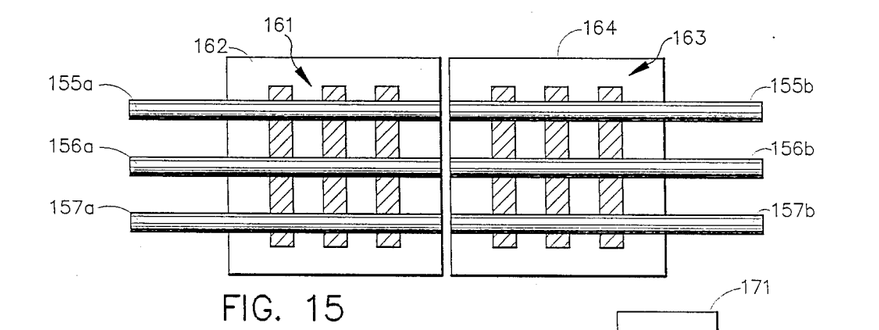
FIG. 15 shows two building blocks arranged for straight splicing.

Interconnection involves the transmission of light signals between two points in space and can be accomplished by a segment of optical waveguide, an example of which is shown in FIG. 15. That figure will be discussed later but it provides an example of simple interconnection from the left side, for example, through block 162. The signal guiding effect can be made possible by the use of an optical fiber which is aligned and positioned by the relief pattern of the building block as has already been described. The relief pattern of the master substrate is accordingly made to accommodate the adhesively bonded fiber segment of the building block and the relief pattern as shown in FIG. 9. Other ways of making the waveguide will be discussed later. They do not affect the principles of the invention or the mating aspects of the relief patterns.

Figure 12:
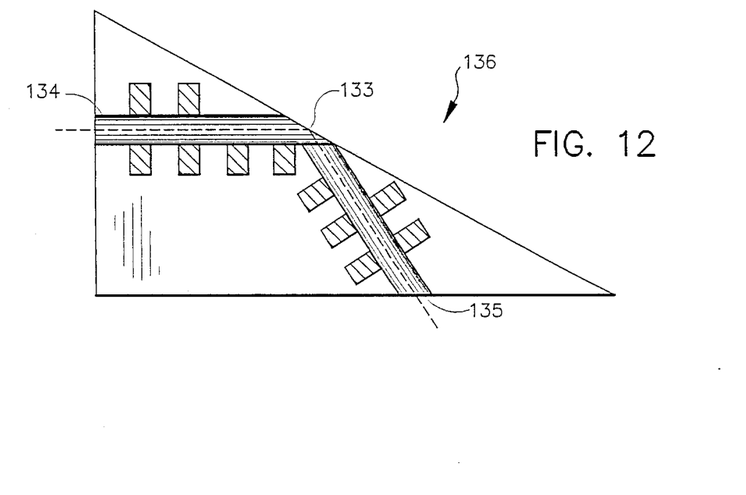
FIG. 12 shows a building block structure for bending of a light beam.

An example of bending is shown in FIG. 12. A bending element and an interconnection element are both used to guide light signals from one point ot another. However, a bending element is defined by the fact that the optical axis of the input end of the waveguide forms an angle with respect top the optical axis of the output portion of the waveguide. One way to bend the optical signals is to make use of a dielectric or metallic total reflecting surface 133 as shown in FIG. 12. In this case, two straight waveguide segments 134 and 135 are located on the flat surface of building block 136 so as to allow light signals carried by fiber 134 to be substantially totally reflected into waveguide 135. The angle between the axes of the two waveguides may be chosen to be $\pi/2$ radians but it is not necessary for that to be the angle employed. Note the relief pattern shown on building block 136 which has a mating counterpart on a master substrate. As stated before, building blocks are made to facilitate mounting different building blocks side by side on the master substrate to allow light signals to be transferred between adjacent building blocks.

Figure 13:
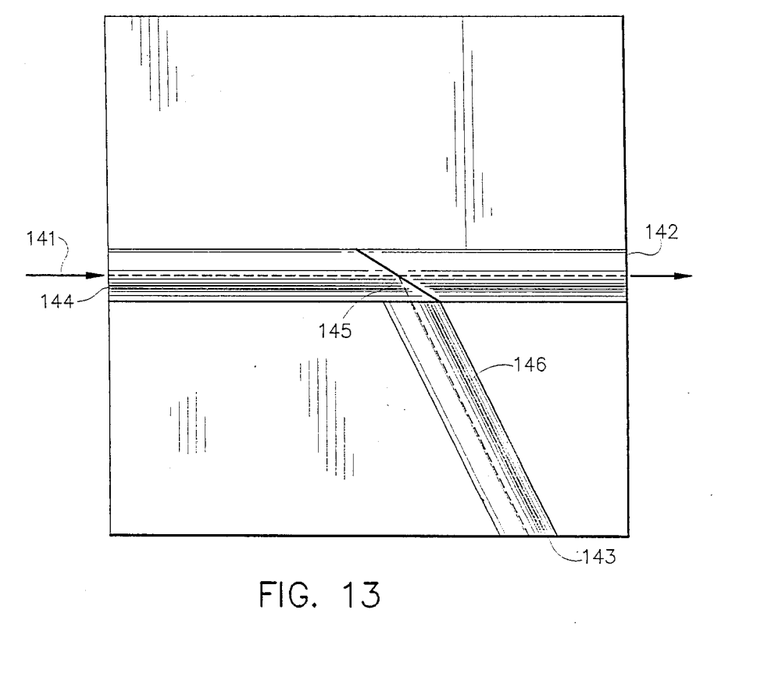
FIG. 13 similarly shows a branching building block.
Figure 14:
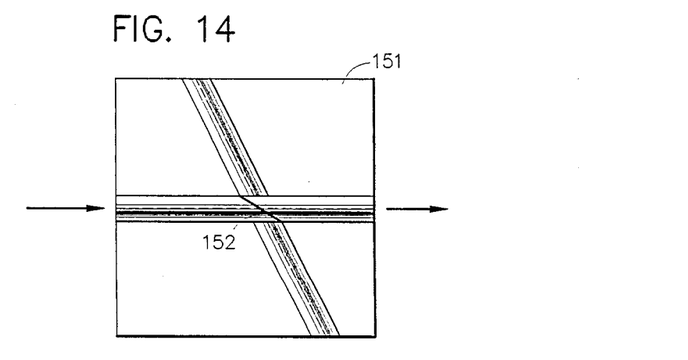
FIG. 14 similarly shows a 4-port combining or splitting building block.

A branching element is used to split an incoming light beam into two or more light beams. This is illustrated in FIGS. 13 and 14. The split beams may carry the same or different amounts of power. If incoming beam 141 consists of more than one monochromatic optical wavelength, the beam may be spectrally separated so that each beam after the split consists of only one monochromatic wavelength. Note that although the term "monochromatic" is used it also contemplates quasi monochromatic, something less than completely monochromatic. In the case of a branching element with two output ports, light which enters input port 144 is split into two beams by beam splitter 145, thereby resulting in outputs at output ports 142 and 143. The splitting ration of any output port to input port power can be chosen to be anywhere in the range of 0 to 1. Where it is 0, the result is an interconnection element rather than a beam splitter. Where the ratio at output 143 to the input is 1, the element is merely a bending element, again not a beam splitter.

The splitting of a light beam can be accomplished by using semitransparent metallic or dielectric layer 145. The waveguide which connects input 144 with output 142 is cut into two pieces on a diagonal and semitransparent layer 145 is applied to one of the elliptical surfaces of the cut waveguide. Thereafter the cut pieces are reunited and inserted into the appropriate location in the relief pattern on the building block. The waveguide that terminates at port 143 is positioned in the relief pattern on the building block in such a way that the light reflected from surface 145 is optimally launched into waveguide 146.

If semitransparent layer 145 is made spectrally selective it is possible to let one wavelength band become transmitted and to reflect another wavelength band. Depending on the spectral characteristics of the reflecting layer, the branching element can act either as a beam splitter or as a wavelength demultiplexer.

A light combining element is used for uniting two or more light beams into one beam. This is the reverse condition of a branching element and FIG. 13 can be used as an example of that function. Note that FIG. 1 shows such devices, particularly building block 26. When light is injected into ports 142 and 143 the combined beam will emerge at port 144. The way in which the combining element is implemented is substantially the same as described with regard to the branching element. The beam that enters port 142 may have the same or different wavelength as the beam entering port 143. If the wavelengths are different, the reflecting surface 145 should be made so that the beam which is injected into port 142 is totally transmitted while at the same time light injected into port 143 is totally reflected. In this case the combining element acts as a wavelength multiplexer.

FIG. 14 shows four-port combining element 151. As indicated previously, any port or ports may function as an input and any port or ports may function as an output. Reflective surface 152 is positioned as described with respect to FIG. 13. Note that FIG. 14 may be thought of as a representation of building block 23 of FIG. 1.

One way to make a splitting element is to use the approach already described with respect to FIG. 13. If the splitting ratio with respect to the output port 143 is made small the waveguide that connects ports 144 and 142 serves as the trunk waveguide while the branch waveguide ends at port 143. On the other hand, if the splitting ratio between output port 143 and input port 144 is made close to 1, the trunk waveguide in effect terminates at point 143 and the branch waveguide terminates at port 142.

For purposes of simple splicing, the relief patterns of two building blocks can be made to form grooves which can be used for alignment for an array of incoming optical fibers to an array of outgoing optical fibers as shown in FIG. 15. For example, fibers 155a, 156a and 157a are positioned by the elements of relief pattern 161 on building block 162 and axially aligned optical fibers 155b, 156b and 157b are aligned in relief pattern 163 on building block 164. When the two blocks are mounted on the master substrate as previously described, the two arrays of optical fibers will automatically be aligned to each other and light signals can be transferred from the first building block to the second building block with minimal attenuation. The numbers of fibers in the array can be one or a multiplicity.

Figure 16:
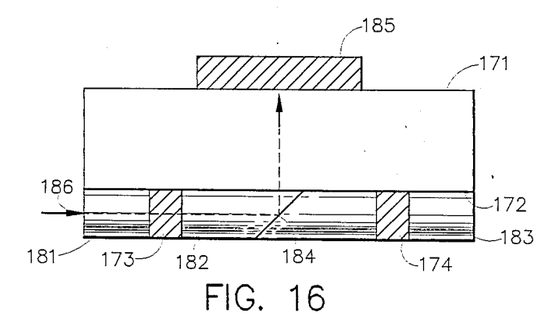
FIG. 16 is a schematic side view of a transmitter/receiver block.
Figure 17:
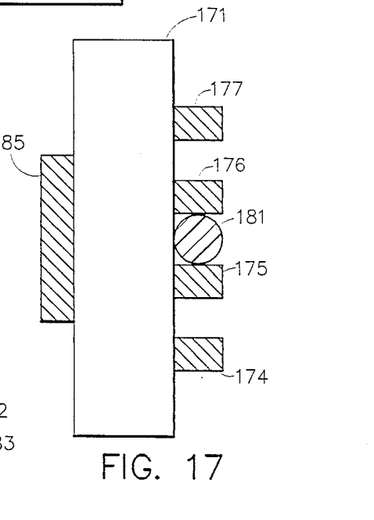
FIG. 17 is an end view of the block of FIG. 16.

The passive functions have been described above. The building blocks with active functions are set forth below. A detection function can be realized when a building block is used for the purpose of transformation of optical signals into electrical signals such as by means of a photosensitive element. An example is a photodiode which is made a constituent part of the building block. FIGS. 16 and 17 show examples of this structure. Building block substrate 171 is formed with flat surface 172 and relief pattern elements 173–177. Optical fiber 181 is positioned closely between relief pattern elements 175 and 176 and is formed of segments 182 and 183 separated by reflecting surface 184. Of course, substrate 171 must be formed of optically transmissive material, or at least have a central portion which is optically transmissive. Photodiode 185 is positioned on the opposite side of substrate 171 from fiber 181 and, with light input 186 reflected from surface 184, the optical signal is detected by photodetector 185. Normal electrical connections are attached to the photodiode but have not been shown here because they are not necessary to the explanation of the invention. Light signals 186 can be delivered from a neighboring building block or can be fed into the detection block from an external optical fiber.

A transmitter unit could look substantially the same as the detection unit of FIG. 16 where the photosensitive element is exchanged for a light source such as a light emitting diode (LED) or a laser diode (LD). In this case, the generated light is reflected into the waveguide of the building block. It should be recognized that there are other ways to arrange the geometry of the transmitter unit. Normally, however, the generated light is fed into a waveguide that is located on that flat surface of the building block positioned by the relief pattern.

The relief pattern on either the building block or the master substrate may be configured to position discrete devices such as photodetector 185 or a light source. The relief pattern can also be configured to constitute a fixture for different types of optically nonlinear passive devices, such as harmonic light generators, optical bistable elements and phase conjugate mirrors.

Finally, the system may be made to provide the function of light modulation. Just as light sensitive and light emitting elements can be integrated into the building block design, it is possible to integrate electro-, acousto- and magneto-optical components as constituent parts of a building block. These components can be used for a large variety of operations, such as phase and intensity modulation and light switching. No drawing figure is provided because it would not differ substantially from FIGS. 16 and 17. Element 185 can represent any such component. Alternatively, such a component could be located directly in the optical path, rather than being on the opposite side of the building block. In all cases, the building blocks continue to employ a relief pattern which is used for alignment of a building block to a substrate, but also may be used as a mechanical fixture for the above mentioned optical components. In most cases it is also necessary to use waveguides to carry the light signals within a building block or group of building blocks.

It has been assumed throughout the above discussion that the relief pattern receives an optical fiber in a precise location in a nestled condition. However, there are other ways in which the optical waveguide can be formulated while continuing to use the principles of the invention.

Figure 18:
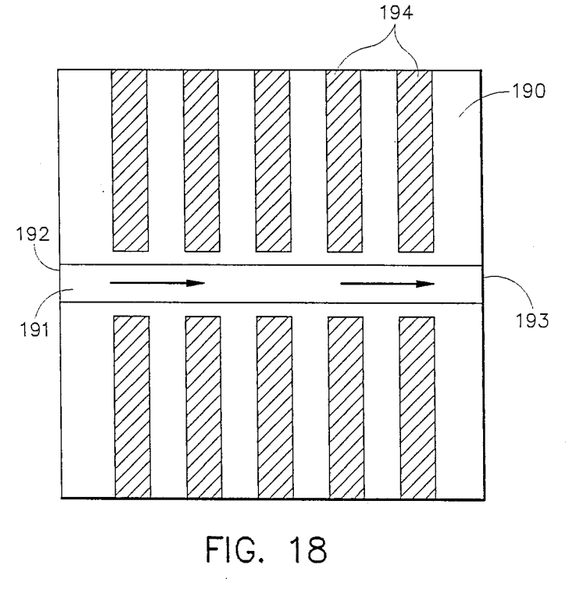
FIG. 18 is a top view of an alternative embodiment of a building block with an optical waveguide.
Figure 19:
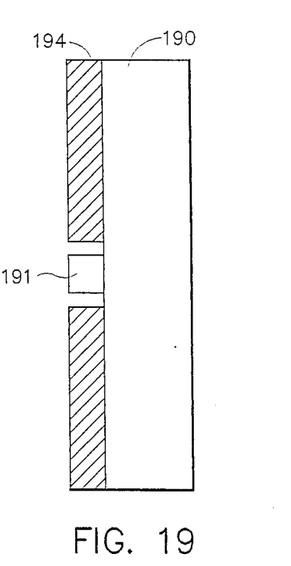
FIG. 19 is an end view of the building block of FIG. 18.

FIGS. 18 and 19 display an alternative means for forming the waveguide by photolithographic means. Optical waveguide 191 transports light from input port 192 to output port 193, or vice versa. Relief pattern elements 194 are formed on substrate 190 as previously discussed. The difference here is that waveguide 191 is formed as a segment of the relief pattern of the building block in such a way that the segment constitutes a waveguide. In this case, a necessary prerequisite is to make the relief pattern from an optically transparent material, such as, for example, a transparent polymeric material. It is also necessary to use a substrate material with a lower refractive index than that of the relief pattern. Given these characteristics, waveguide 191 can function the same as the discrete optical fiber which has been the subject of the structures described above.

Figures 20, 21:
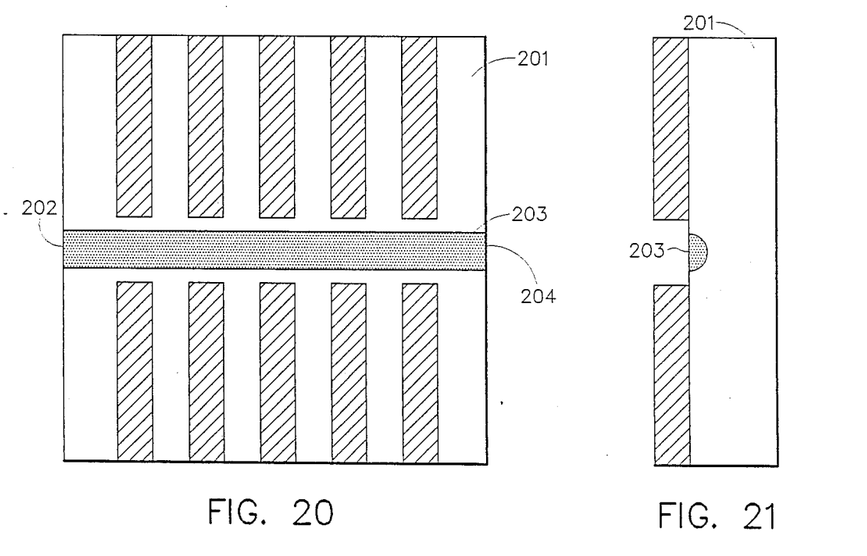
FIG. 20 is a top view similar to FIG. 18 of another alternative embodiment of a building block with optical waveguide.
FIG. 21 is an end view of the building block of FIG. 20.

With respect to FIGS. 20 and 21, a third way to accomplish the guiding of light signals between input 202 and output 204 of optical waveguide 203 positioned on building block substrate 201 is to form a waveguide in the surface region of the building block substrate material itself. This can be accomplished by diffusion, ion implantation or ion exchange of a suitable doping material into the surface of the substrate, thus creating a higher refractive index in the doped material. In this case, it is important to make the building block substrate of an optically transparent material so that the diffused area creates the desired optical waveguide.

It should be noted that any of the three methods for providing an optical waveguide can be used for any of the building block configurations described above.

Figure 22A:
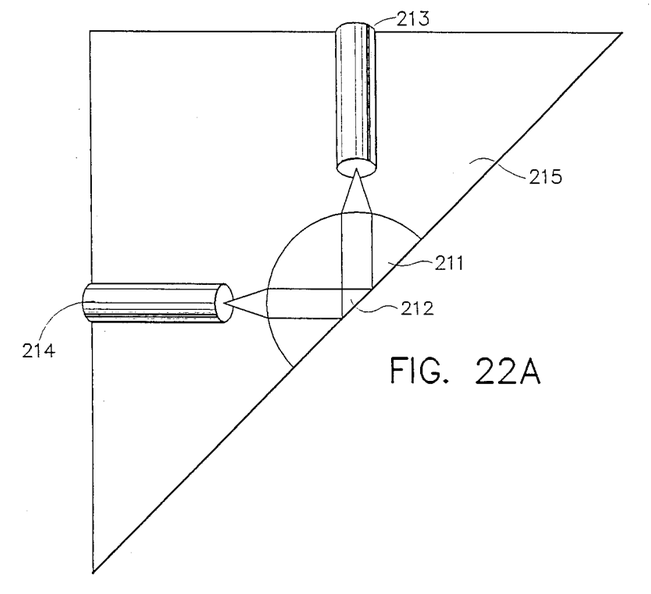
FIG. 22A schematically shows a means for coupling light between waveguides in a building block.
Figure 22B:
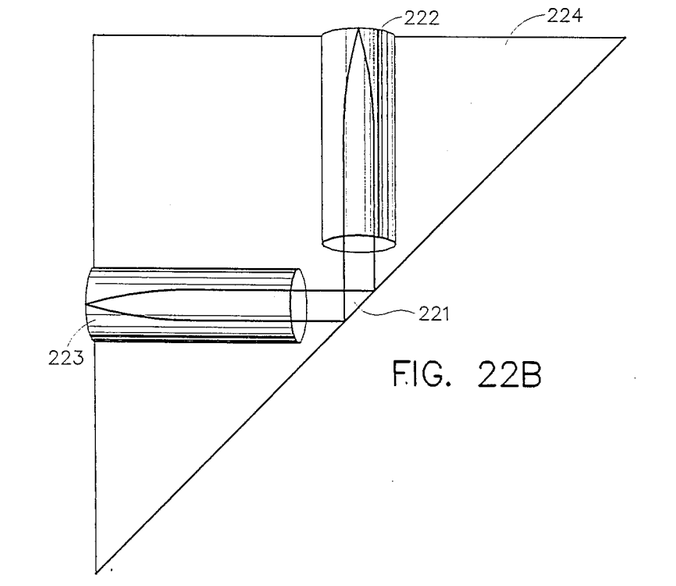
FIG. 22B is a view similar to FIG. 22A showing an alternative embodiment for light coupling.

FIGS. 22A and 22B disclose means for providing imaging elements to couple light between the optical waveguide within a single building block substrate. FIG. 22A shows a sphere 211 which, in conjunction with reflecting surface 212, permits light to be coupled between optical waveguide 213 and 214 mounted on substrate 215. Sphere 211 can be formed by changing the refractive index in the substrate as described above with respect to FIGS. 20 and 21. Alternatively, the sphere could be made in some other fashion.

FIG. 22B shows similar coupling by means of reflecting surface 221 of light between fibers 222 and 223 on building block substrate 224.

One factor that has been crucial in prior attempts at any building block concept is the positioning of the optical fibers. Another important requirement is to keep the tolerances of the block tight enough to make the block fit together. These challenges have been met by this invention.

The concept of optical building blocks can be utilized in a large variety of industrial applications. Some of these applications include local area networks (LAN's) instrumentation, measurement and telecommunications. All of these areas can make great use of the different functions that can be realized with the building block concept of this invention.

To summarize, the relief pattern on the surface of the building block may embody some or all components whether discrete or otherwise, that define the functions of the building block. The relief pattern is also used as a mechanical fixture for the passive or active components that define the functions of the block and the relief pattern is used to align and position building blocks in predefined locations on the master substrate.

In view of the above description it is likely that modifications and improvements will occur to those skilled in the art which are within the scope of the appended claims. For example, it is possible that optical elements could be mounted in the master substrate relief pattern area, not just in the building block relief pattern. It is also possible that the intermediate substrate flat surfaces could range in size from being coextensive with one building block to being coextensive with the flat surface of the master substrate. Several building blocks could be mountd to the intermediate substrate, while several others are mounted directly to the master substrate.

What is claimed is:

1. A micro-optical building block system comprising:
   a master substrate having at least one flat surface and being formed of substantially rigid material;
   a relief pattern on said master substrate flat surface, said relief pattern comprising a plurality of lands and grooves arranged in a first predetermined pattern;
   at least one building block substrate having at least one flat surface which is no larger than said master substrate flat surface, said building block substrate being formed of substantially rigid material;

a relief pattern on said building block substrate flat surface, said relief pattern comprising a plurality of lands and grooves arranged in a second predetermined pattern, said first and second predetermined patterns being configured to mate in a meshig manner whereby said building block substrate fits on said master substrate in at least one precisely positioned location; and optical signal conducting means being selectively included as part of at least one of said master and building block substrates.

2. The building block system recited in claim 1, wherein said relief pattern on said master substrate flat surface is comprised of a plurality of adjacent, repetitive said predetermined patterns.

3. The building block system recited in claim 1, wherein said relief pattern on said master substrate flat surface is comprised of a plurality of adjacent patterns of differing configurations.

4. The building block system recited in claim 1, wherein said relief pattern on said master substrate comprises a single pattern substantially coextensive with said flat surface.

5. The building block system recited in claim 1, wherein said signal conducting means is selectively mounted to one of said master substrate and said building block relief patterns.

6. The building block system recited in claim 5, wherein said optical signal conducting means is mounted in said building block relief pattern.

7. The building block system recited in claim 5, wherein said optical signal conducting means is mounted in said master substrate relief pattern.

8. The building block system recited in claim 1, wherein said optical signal conducting means is mounted between said master substrate and said building block flat surfaces.

9. The building block system recited in claim 1, and further comprising:

at least one intermediate substrate having at least two flat surfaces, both of said two flat surfaces being no larger than said master substrate flat surface, said intemediate substrate being formed of substantially rigid material; and a first relief pattern on said one intermediate substrate flat surface;

said intermediate substrate being positioned between the respective said flat surfaces of said master substrate and said building block with said first relief pattern mating in a meshing manner with the confronting said relief pattern on said master substrate or said building block.

10. The building block system recited in claim 9, and further comprising:

a second flat surface on said intermediate substrate, said second flat surface facing in a direction opposite to said one flat surface;

a second relief pattern on said second flat surface of said intermediate substrate, said second relief pattern mating in a meshing manner with the other of said relief patterns on said master substrate and said building block.

11. The building block system recited in claim 9, wherein said optical signal conducting means is selectively positioned between said intermediate substrate and one of said master substrate and building block.

12. The building block system recited in claim 9, wherein said optical signal conducting means is positioned between said intermediate substrate and both said master substrate and said building block.

13. The building block system recited in claim 10, wherein said optical signal conducting means is mounted in and confined by the respective meshing relief patterns on both sides of said intermediate substrate and the confronting relief patterns on said master substrate and said building block.

14. The building block system recited in claim 1, and further comprising:

a plurality of building blocks, each having at least one flat surface, said one flat surface being smaller than said master substrate flat surface;

said flat surface of each said building block of said plurality of building blocks having a relief pattern thereon comprising a plurality of lands and grooves in a predetermined pattern configured to mate in a meshing manner in at least one predetermined location in said predetermined relief pattern on said master substrate.

15. The building block system recited in claim 14, wherein at least some of said building blocks of said plurality of building blocks are in functional communication with adjacent said building blocks and are mutually self-aligning on said master substrate.

16. The building block system recited in claim 15, wherein said at least some of said building blocks together comprise a functionally unitary combination.

17. The building block system recited in claim 1, wherein said optical signal conducting means comprises a discrete optical fiber.

18. The building block system recited in claim 1, wherein said optical signal conducting means selectively comprises a portion of said lands of at least one of said master substrate and said building block relief patterns.

19. The building block system recited in claim 18, wherein said lands of said one of said relief patterns is formed of optically transparent material.

20. The building block system recited in claim 19, wherein said optically transparent relief pattern material has a refractive index higher than that of said substrate on which said relief pattern resides.

21. The building block system recited in claim 1, wherein said optical signal conducting means is formed as a waveguide in said flat surface of one of said master substrate and said building block.

22. The building block system recited in claim 21, wherein said waveguide is formed by diffusion of doping material into said flat surface.

23. The building block system recited in claim 22, wherein said waveguide has a refractive index higher than that of said substrate in which said waveguide is formed.

24. The building block system recited in claim 21, wherein said waveguide is formed by ion exchange into said flat surface.

25. The building block system recited in claim 21, wherein said waveguide is formed by ion implantation into said flat surface.

26. The building block system recited in claim 1, wherein said building block flat surface is rectangular in shape.

27. The building block system recited in claim 26, wherein said building block is cut through said flat surface into two pieces, forming two mating edges, at least one of said two mating edges being polished and coated with a substance to make said coated edge a partially reflecting surface.

28. The building block system recited in claim 27, wherein said coated edge functions as an optical filter.

29. The building block system recited in claim 28, wherein said optical filter is wavelength sensitive, functioning to selectively reflect, transmit and partially transmit light signals of varying predetermined wavelengths.

30. The building block system recited in claim 27, wherein said coated edge further functions to change the direction of light in said optical signal conducting means by means of at least partial reflection.

31. The building block system recited in claim 30, wherein said optical signal conducting means is formed of two elements at an angle with respect to each other, coupling at said coated edge.

32. The building block system recited in claim 9, and further comprising:
a plurality of building blocks, each having at least one flat surface, said one flat surface being smaller than said master substrate flat surface;
said flat surface of each said building block of said plurality of building blocks having a relief pattern thereon comprising a plurality of lands and grooves in a predetermined pattern configured to selectively mate in a meshing manner in at least one predetermined location in one of said relief patterns on said master substrate and said intermediate substrate.

33. The building block system recited in claim 10, and further comprising:
a plurality of building blocks, each having at least one flat surface, said one flat surface being smaller than said master substrate flat surface;
said flat surface of each said building block of said plurality of building blocks having a relief pattern thereon comprising a plurality of lands and grooves in a predetermined pattern configured to selectively mate in a meshing manner in at least one predetermined location in one of said relief patterns on said master substrate and said intermediate substrate.

34. the building block system recited in claim 1, and further comprising:
an active optical element selectively mounted to one of said master substrate and building block, said optical element being selected from the group consisting of light detectors, light emitters and electro-optical, acousto-optical and magneto-optical components; and
means for functionally coupling said optical signal conducting means and said active optical element together.

35. The building block system recited in claim 34, wherein said active optical element comprises a photosensor.

36. The building block system recited in claim 35, wherein said photosensor converts light to electrical signals.

37. The building block system recited in claim 34, wherein said active optical element comprises a light emitting element for converting electrical signals to optical signals.

38. The building block system recited in claim 34, wherein said active optical element comprises light modulation means.

39. The building block system recited in claim 38, wherein said light modulation means comprises an electro-optical component.

40. The building block system recited in claim 38, wherein said light modulation means comprises an acousto-optical component.

41. The building block system recited in claim 38, wherein said light modulation means comprises a magneto-optical component.

42. The building block system recited in claim 38, wherein said light modulation means is a phase modulator.

43. The building block system recited in claim 38, wherein said light modulation means comprises an intensity modulator.

44. The building block system recited in claim 38, wherein said light modulation means comprises optical switching means.

45. The building block system recited in claim 1, wherein said optical signal conducting means at least partially comprises nonlinear waveguides.

46. The building block system recited in claim 37, wherein said light modulation means comprises a frequency modulator.

47. The building block system recited in claim 34, wherein said active optical element comprises a frequency modulator.

48. The building block system recited in claim 1, and further comprising:
passive optical means selectively mounted to one of said master substrate and building block; and
means for functionally coupling said optical signal conducting means and said passive optical means together.

49. The building block system recited in claim 48, wherein said passive optical means comprises a harmonic light generator.

50. The building block system recited in claim 48, wherein said passive optical means selectively comprises a parametric oscilllator or amplifier selectively functioning for sum or difference frequency generation.

51. A method for making a micro-optical building block system comprising the steps of:
forming a master substrate with a flat surface on one side thereof;
forming a relief pattern on the master substrate flat surface, said relief pattern comprising a plurality of lands and grooves arranged in a first predetermined pattern;
forming at least one building block substrate having at least one flat surface on one side thereof;
forming a relief pattern on the building block flat surface, said building block relief pattern comprising a plurality of lands and grooves arranged in a second predetermined pattern;
forming optical signal conducting means on at least one of said relief patterns; and
mounting said building block to said master substrate with their respective relief patterns engaging in a meshing manner.

52. The method recited in claim 51, wherein said relief patterns are formed photolithographically.

53. The method recited in claim 51, wherein said optical signal conducting means comprises discrete optical fibers mounted to said relief pattern.

54. The method recited in claim 53, wherein said optical fibers are secured to said relief pattern by an adhesive.

55. The method recited in claim 51, wherein said optical signal conducting means is formed photolithographically on one of said flat surfaces as a part of said relief pattern.

56. The method recited in claim 51, wherein said optical signal conducting means is formed by diffustion of doping material into said flat surface.

57. The method recited in claim 51, wherein said optical signal conducting means is formed by ion exchange into said flat surface.

58. The method recited in claim 51, and comprising the further steps of:
forming at least one intermediate substrate having two oppositely disposed flat surfaces thereon;
forming relief patterns on both said flat surfaces on said intermediate substrates, said relief patterns on said intermediate substrate being arranged in third and fourth predetermined patterns;
mounting said intermediate substrate to said master substrate with their respective relief patterns engaging in a meshing manner; and
mounting at least one said building block to said intermediate substrate with their relief patterns engaging in a meshing manner.

59. The method recited in claim 51, wherein said relief patterns are formed by means of etching.

60. The method recited in claim 51, wherein said relief patterns are formed by means of stamping.

61. The method recited in claim 51, wherein said relief patterns are formed by means of embossing.

62. The method recited in claim 51, wherein said relief patterns are formed by means of laser etching.

63. The method recited in claim 51, wherein said relief patterns are formed by means of laser machining.

64. The method recited in claim 51, wherein said relief patterns are formed by means of grinding.

65. The method recited in claim 51, wherein said relief patterns are formed by means of machining.

66. The method recited in claim 51, wherein said relief patterns are formed by molding.

67. The method recited in claim 51, wherein said relief patterns are formed by electrochemical machining.

68. The method recited in claim 51, wherein said relief patterns are formed by hydrodynamic machining.

69. The method recited in claim 51, wherein said relief patterns are formed by abrasive jet machining.

70. The method recited in claim 51, wherein said relief patterns are formed by ultrasonic machining.

71. The method recited in claim 51, wherein said optical signal conducting means is formed by ion implantation.

* * * * *